(12) United States Patent
Surkatty

(10) Patent No.: US 9,703,974 B1
(45) Date of Patent: Jul. 11, 2017

(54) COORDINATED FILE SYSTEM SECURITY VIA RULES

(71) Applicant: Amazon Technologies, Inc., Reno, NV (US)

(72) Inventor: Osman Surkatty, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/137,368

(22) Filed: Dec. 20, 2013

(51) Int. Cl.
  *H04L 29/06* (2006.01)
  *G06F 21/00* (2013.01)
  *G06F 21/62* (2013.01)
  *G06F 11/30* (2006.01)
  *G06F 21/56* (2013.01)
  *G06F 17/30* (2006.01)

(52) U.S. Cl.
  CPC ...... *G06F 21/6218* (2013.01); *G06F 11/3006* (2013.01); *G06F 21/56* (2013.01); *H04L 63/0227* (2013.01); *H04L 63/0263* (2013.01); *H04L 63/20* (2013.01)

(58) Field of Classification Search
  CPC . H04L 63/20; H04L 63/0227; H04L 63/0263; H04L 63/10; H04L 41/0893; G06F 21/56; G06F 21/6218; G06F 11/3006; G06F 17/30011; G06F 17/30067; G06F 17/30082; G06F 17/30085; G06F 17/30115; G06F 3/067
  See application file for complete search history.

(56) References Cited

U.S. PATENT DOCUMENTS

| | | | | |
|---|---|---|---|---|
| 6,530,024 B1 * | 3/2003 | Proctor | ................ | G06F 21/552 |
| | | | | 709/224 |
| 6,647,400 B1 * | 11/2003 | Moran | | |
| 6,839,850 B1 * | 1/2005 | Campbell | .............. | G06F 21/55 |
| | | | | 709/223 |
| 7,007,301 B2 * | 2/2006 | Crosbie | ................. | G06F 21/552 |
| | | | | 707/999.202 |
| 7,114,185 B2 * | 9/2006 | Moore et al. | ................... | 726/24 |
| 7,636,736 B1 * | 12/2009 | Kumar | ............. | G06F 17/30144 |
| 7,665,139 B1 * | 2/2010 | Szor | ..................... | G06F 21/554 |
| | | | | 713/100 |
| 7,805,752 B2 * | 9/2010 | Newstadt et al. | ................ | 726/1 |

(Continued)

OTHER PUBLICATIONS

Symantec. "Norton AntiVirus Corporate Edition Implementation Guide", 2000.*

(Continued)

*Primary Examiner* — Michael Simitoski
(74) *Attorney, Agent, or Firm* — Klarquist Sparkman, LLP

(57) ABSTRACT

A method and system are disclosed for coordinated file system security via rules. A file system condition rule can specify any of a wide variety of file system conditions related to security risks, such as sensitive information in impermissible locations, impermissible file permissions, stray files, and the like. The rules can be administered at a central location and distributed across machines. The machines can then execute the rules against their local file systems. The rules can further specify actions to be taken, including deleting files, sanitizing files, sending an alert, or the like. Violations can be tracked and analyzed to determine what is causing recurring scenarios. A web service can expose the technologies to cloud service consumers.

23 Claims, 10 Drawing Sheets

(56) References Cited

U.S. PATENT DOCUMENTS

| | | | |
|---|---|---|---|
| 7,996,373 B1* | 8/2011 | Zoppas et al. | 707/694 |
| 8,321,935 B1* | 11/2012 | Chen et al. | 726/22 |
| 8,522,050 B1* | 8/2013 | Wakerley | 713/193 |
| 8,938,778 B2* | 1/2015 | Shiyafetdinov | G06F 21/602 |
| | | | 713/193 |
| 9,256,727 B1* | 2/2016 | Manmohan | G06F 21/60 |
| 2002/0073313 A1* | 6/2002 | Brown | G06F 21/62 |
| | | | 713/165 |
| 2003/0110280 A1* | 6/2003 | Hinchliffe et al. | 709/232 |
| 2004/0098415 A1* | 5/2004 | Bone et al. | 707/200 |
| 2004/0167984 A1* | 8/2004 | Herrmann | 709/229 |
| 2004/0225645 A1* | 11/2004 | Rowney et al. | 707/3 |
| 2005/0050337 A1* | 3/2005 | Liang et al. | 713/188 |
| 2005/0262557 A1* | 11/2005 | Fellenstein et al. | 726/22 |
| 2006/0004820 A1* | 1/2006 | Claudatos et al. | 707/101 |
| 2006/0005240 A1* | 1/2006 | Sundarrajan | H04L 63/0272 |
| | | | 726/15 |
| 2006/0031347 A1* | 2/2006 | Sahi | 709/206 |
| 2006/0043164 A1* | 3/2006 | Dowling et al. | 235/375 |
| 2006/0075228 A1* | 4/2006 | Black et al. | 713/167 |
| 2006/0117063 A1* | 6/2006 | Havewala et al. | 707/104.1 |
| 2007/0156897 A1* | 7/2007 | Lim | 709/225 |
| 2007/0244877 A1* | 10/2007 | Kempka | G06F 17/30067 |
| 2007/0266079 A1* | 11/2007 | Criddle et al. | 709/203 |
| 2008/0059474 A1* | 3/2008 | Lim | 707/9 |
| 2008/0222734 A1* | 9/2008 | Redlich et al. | 726/26 |
| 2009/0300532 A1* | 12/2009 | Cowan | G06F 21/53 |
| | | | 715/771 |
| 2010/0024037 A1* | 1/2010 | Grzymala-Busse et al. | 726/26 |
| 2010/0043072 A1* | 2/2010 | Rothwell | G06F 21/566 |
| | | | 726/24 |
| 2010/0251363 A1* | 9/2010 | Todorovic | 726/22 |
| 2012/0023494 A1* | 1/2012 | Harrison | G06F 21/53 |
| | | | 718/1 |
| 2012/0023576 A1* | 1/2012 | Sorensen | G06F 21/577 |
| | | | 726/22 |
| 2012/0303882 A1* | 11/2012 | Hershler | 711/103 |
| 2012/0311332 A1* | 12/2012 | Johnsen | H04L 9/3234 |
| | | | 713/168 |
| 2013/0089089 A1* | 4/2013 | Kamath | H04L 12/413 |
| | | | 370/358 |
| 2013/0212006 A1* | 8/2013 | Siddens | G06Q 20/4016 |
| | | | 705/39 |
| 2014/0007181 A1* | 1/2014 | Sarin et al. | 726/1 |
| 2014/0033310 A1* | 1/2014 | Cheng | 726/23 |
| 2014/0157426 A1* | 6/2014 | Paek et al. | 726/26 |
| 2014/0196115 A1* | 7/2014 | Pelykh | H04L 63/08 |
| | | | 726/4 |
| 2014/0237604 A1* | 8/2014 | Guarnieri | G06F 21/577 |
| | | | 726/25 |
| 2014/0359085 A1* | 12/2014 | Chen | H04L 41/0803 |
| | | | 709/220 |
| 2015/0121061 A1* | 4/2015 | Goyal | G06F 9/455 |
| | | | 713/152 |
| 2015/0121369 A1* | 4/2015 | Thankappan | G06F 9/45533 |
| | | | 718/1 |
| 2015/0121449 A1* | 4/2015 | Cp | H04L 63/145 |
| | | | 726/1 |

OTHER PUBLICATIONS

Symantec. "Symantec System Center Implementation Guide", 2000.*
"What Is /dev/shm and Its Practical Usage," nixCraft, hosted by cyberciti.biz, visited Oct. 14, 2013, 17 pages.
"Periodically Delete Temporary Filed in Windows with Auto Cleaner," steathsettings.com, Tutoriale Windows, Linux, Noutati IT si Download, visited Oct. 14, 2013, 12 pages.
Bhatnagar, "DeleteMe—Delete Temporary Files Periodically and Automatically," Technix Update, Mar. 30, 2009, 7 pages.
Icewalkerz, "How to Periodically remove temporary files in a Linux," icewalkerz.blogspot.com, 2010, 2 pages.
Quax, Automatically find / delete old files in Linux, Byte Mods.com, Oct. 9, 2009, 3 pages.
"How to automatically delete log files?" Linux Forums, Apr. 9, 2011, 3 pages.
Tmpwatch man page, linuxcommand.org, Dec. 21, 2004, 3 pages.
DoD 5520.22-M, Operating Manual Incorporating Change 1, National Industrial Security Program, Mar. 28, 2013, 140 pages.
"Shred (unix)," Wikipedia, visited Nov. 19, 2013, 2 pages.
Richmond, "Shred and secure-delete," *Free Software Magazine*, Nov. 29, 2008, 8 pages.
"11.6 shred: Remove files more securely," www.gnu.org, visited Nov. 19, 2013, 2 pages.
Srm man page, Ubuntu manuals, Ubuntu.com, visited Nov. 19, 2013, 3 pages.
"Data loss prevention software," *Wikipedia*, visited Nov. 21, 2013, 4 pages.
Wolthusen, "Security policy enforcement at the file system level in the Windows NT operating system family," *Proceedings Computer Security Applications Conference (ACSAC)* 2001, 10, 1109/ACSAC 2001.991521, 2001, 9 pages.
"Audit_rule(7)—Linux man page," die.net, visited Nov. 2, 2013, 5 pages.
"Shred," downloaded from http://www.clearfoundation.com/docs/man/index.php?3s=1 &n=shred, visited Nov. 19, 2013, 2 pages.

* cited by examiner

COORDINATED FILE SYSTEM SECURITY VIA RULES

BACKGROUND

Cloud computing service providers provide hardware and software computing resources hosted in a remote location to users over a network, such as the Internet. Users are able to buy computing resources, such as storage and computing power, on demand. Use of such virtual computing resources can provide a number of advantages, including cost advantages and the ability to adapt to rapidly changing computing resource needs.

In a cloud computing arrangement, the cloud service provider is entrusted with user data, which may contain sensitive or valuable information. Such user data can be a favored target of data intruders who wish to obtain the data for illicit or illegal purposes. So, data and network security are of great importance in a cloud environment.

Although service providers are vigilant about security issues, some problems can still arise. For example, a system may adhere to best practices to avoid security problems when initially deployed. However, over time, the system may drift from its original configuration due to maintenance, testing, or the like. Unfortunately, the introduction of artifacts and subtle changes in the system can leave security holes that allow an attacker to compromise the system or gain information to assist in an attack.

Thus, there is a need for technologies to address such security issues.

DETAILED DESCRIPTION

Example 1—Overview

The technologies described herein can be used for a variety of coordinated file system security scenarios, and adoption of the technologies can provide improved techniques for maintaining data security. File system condition rules can be implemented to detect violation of such rules and take appropriate action, such as deleting a file, sanitizing content, sending an alert, or the like.

The technologies can scale well over large numbers of hosts with little effort by administrators. Schedules can be implemented to control when rules are executed.

Centralized control can be achieved by interaction with a rule server that distributes rules across multiple machines. Different sets of rules can be maintained for different machines or different classes of machines, allowing support of a heterogeneous host environment.

The technologies can be particularly beneficial in detecting artifacts left behind by system administrators, attackers, developers, or the like. Further features can include logging and detection of offending administrators to get a better picture of problem sources.

A web service can be provided for access to the technologies allowing easier adoption and configuration.

The technologies can be helpful for those wishing to better control file system security in a large scale environment. Beneficiaries can also include host users because they enjoy improved overall security in a cloud environment.

Various other features can be implemented and combined as described herein.

Example 2—Example System Implementing Coordinated File System Security

Figure 1:
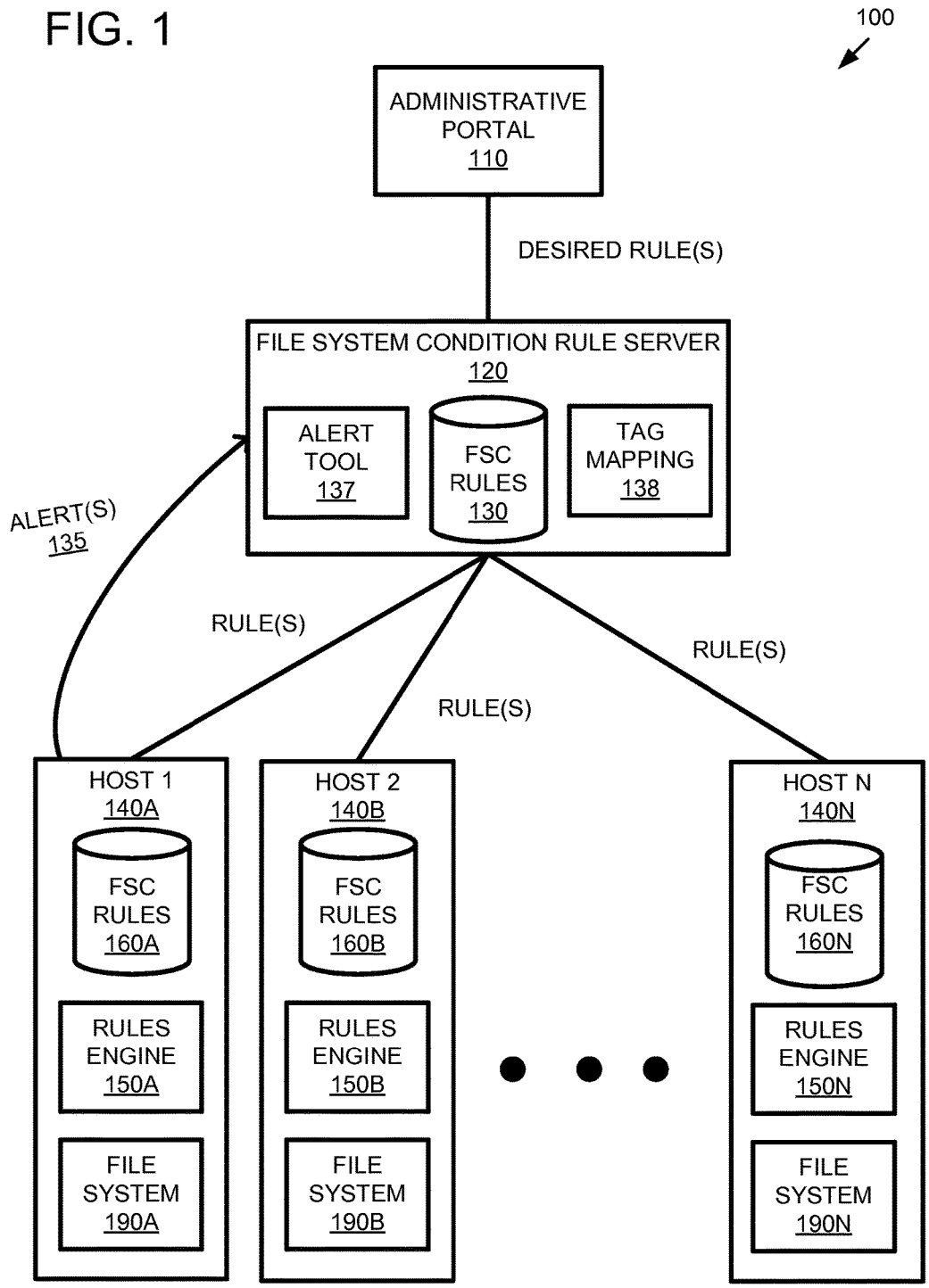
FIG. 1 is a block diagram of an example system implementing coordinated file system security.

FIG. 1 is an illustrative overview of an example implementation of coordinated file system security via rules. In FIG. 1 a file system condition rule server 120 maintains file system condition rules 130, and an administrative portal 110 is provided to administer (e.g., input, edit, delete, or the like) desired file system condition rules. As described herein, the server 120 or other alert collector can also process alerts 135 coming from the hosts 140A-N via an alert tool 137.

As described herein the file system condition rules 130 can be distributed to the hosts 140A-N, which include a local store 160A-N of rules and a rules engine 150A-N that applies the rules 160A-N to respective local file systems 190A-N. A given host 140A out of the hosts 140A-N can thus include a rules engine 150A to apply the local rules 160A at the host 140A against the local file system 190A.

In practice, different rules can be used for different hosts as described herein. So, the hosts 140A-N coupled to the server 120 can be configured to receive at least a subset of the rules 130. For example, the rules 130 can be segmented into different groups associated with tags and subsets of rules associated with the tags can be distributed to groups according to a tag mapping 138 as described herein. The rule server 120 can thus be configured to provide a subset of the rules to a given host out of the hosts 140A-N based on the mapping 138 between tags for the rules 130 and identifiers for the hosts 140A-N.

A wide variety of rules are possible. For example, a given rule can specify a file condition for detecting a violation by a file in the file system that violates the rule and a respective action to take upon detection of the violation. Other examples are described herein.

In practice, the systems shown herein, such as system 100 can vary in complexity, with different functionality, components of differing complexity, and the like. For example, in practice, a host 140A-N can host a plurality of virtual machine instances and execute other tools and services. However, the technologies described herein can be applied to a wide variety of computing scenarios and are not limited to host machines in particular.

Although various components of the systems herein are shown as a single component, in practice, the boundaries between components can be changed. For example, in practice, the server 120 can be implemented across one or more machines, virtual or physical. Functionality can be distributed among such machines as desired. Additional features relating to security and redundancy can also be included.

The system 100, any of the other systems described herein, and subsets of such systems can be implemented in conjunction with any of the hardware components described herein, such as the computing systems described below (e.g., processing units, memory, and the like). In any of the examples herein, the inputs, outputs, associations, tools, engines, and rules can be stored in one or more computer-readable storage media or computer-readable storage devices. The technologies described herein can be generic to the specifics of operating systems or hardware and can be applied in any variety of environments to take advantage of the described features.

Example 3—Example Method Implementing Coordinated File System Security

Figure 2:
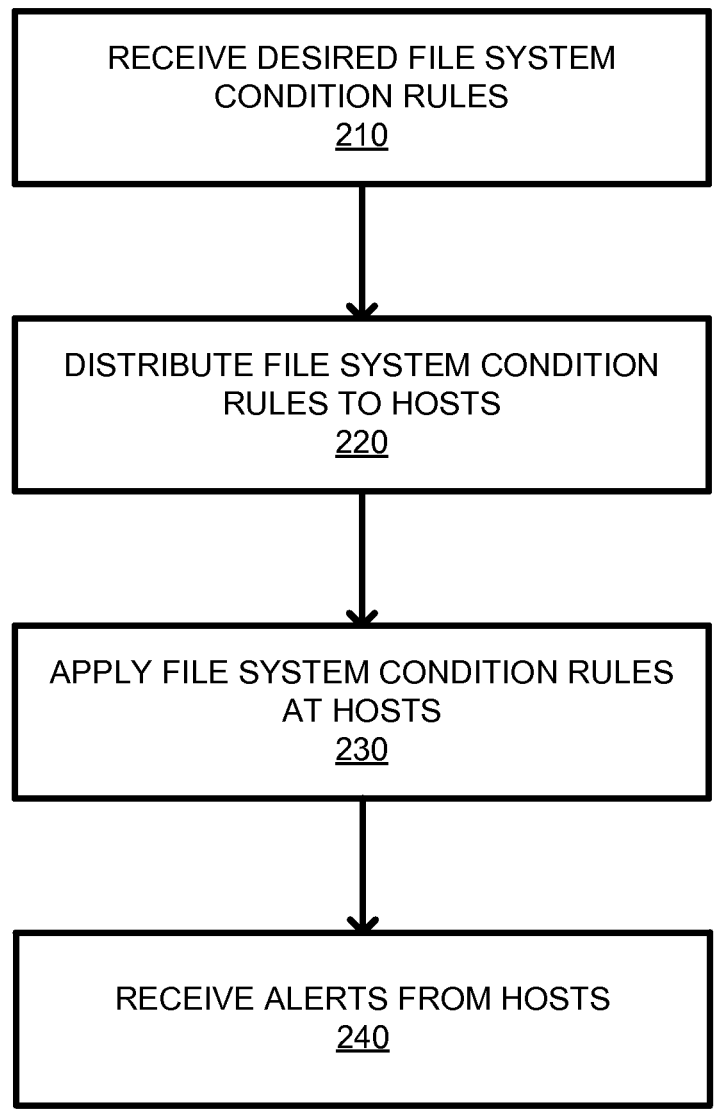
FIG. 2 is a flowchart of an example method of implementing coordinated file system security.

FIG. 2 is a flowchart of an example method 200 of implementing coordinated file system security and can be implemented, for example, in the system shown in FIG. 1 As with the other methods described herein, the order of the acts can be immaterial (e.g., they can be reordered or the like).

At 210, a plurality of file system condition rules are received. For example, a server can receive desired rules from an administrative portal, a web service can be used to receive rules, or the like.

At 220, the rules are distributed to a plurality of hosts. Any distribution, publication, or synchronization technology can be used for distribution. As described herein, rules can be filtered to a subset appropriate for the receiving host (e.g., based on machine type, which can indicate purpose, function, class, group, or the like).

At 230, the file system condition rules are applied across the plurality of host computer systems. As described herein, a rule can specify a file system condition for detecting a violation (e.g., of a condition of the rule) by a file in a file system at a given computer system and a respective action to take upon detection of the violation.

A possible action to take includes sending an alert (e.g., to the rule server or other alert collection system). At 240, one or more alerts are received from the hosts that are applying the rules.

As described herein, alerts can be collected, analyzed, presented to an administrator for consideration, and the like. As a result, of analysis or user interface interaction at an alert collector, actions (e.g., deleting a file or directory, changing file or directory attributes, sanitizing a file or directory, or the like) can be activated as and sent back to the hosts as commands for execution.

The method 200 and any of the other methods described herein can be performed by computer-executable instructions (e.g., causing a computing system to perform the method) stored in one or more computer-readable media (e.g., storage or other tangible media) or stored in one or more computer-readable storage devices.

Example 4—Example Host Computing System

Figure 3:
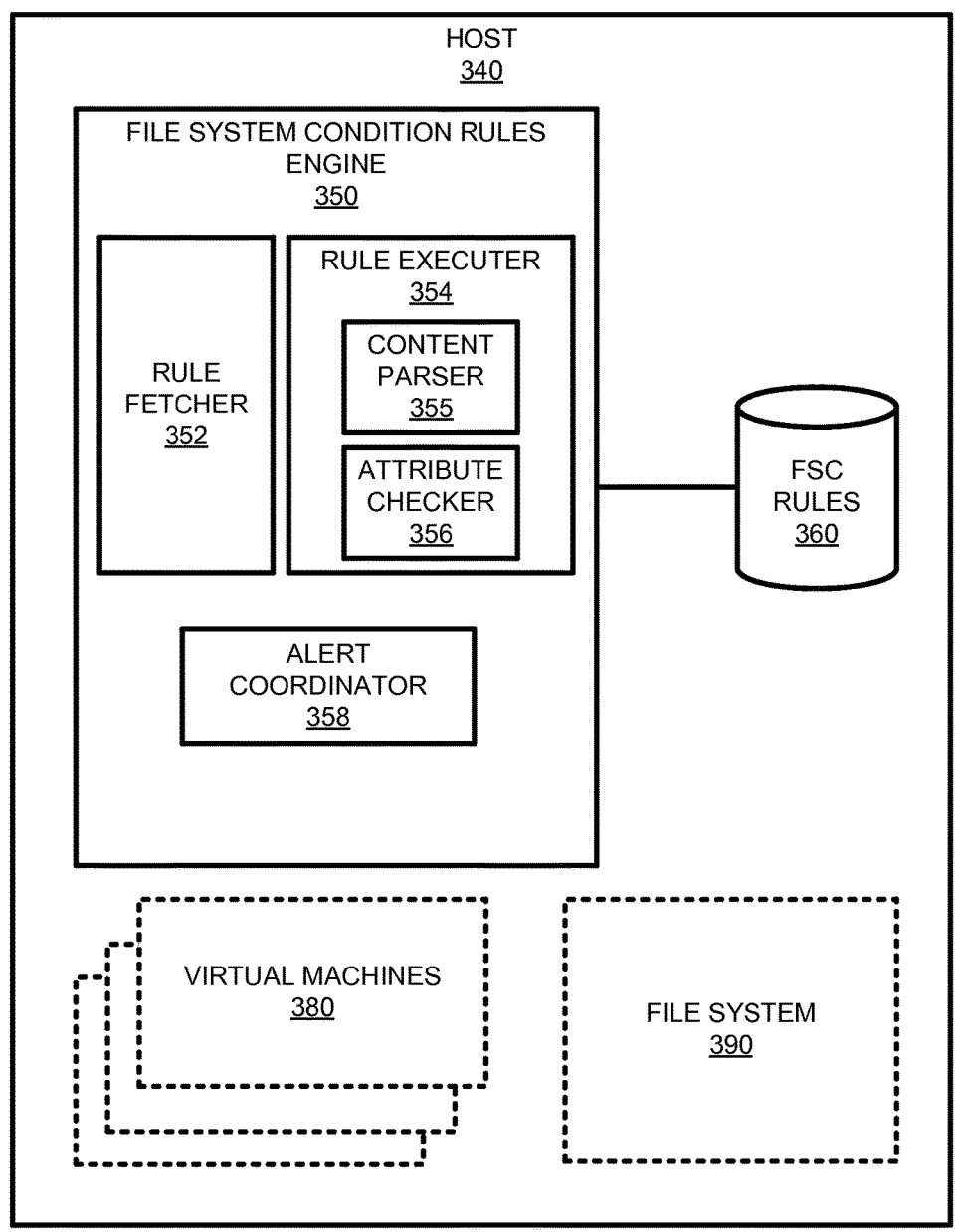
FIG. 3 is a block diagram of an example host computing system implementing coordinated file system security.

FIG. 3 is a block diagram of an example host computing system 340 implementing coordinated file system security via rules and can be implemented in any of the examples herein. For example, the host 340 can be coupled to a rule server (e.g., server 120 of FIG. 1) via a network and receive rules therefrom.

In the example, local file system condition rules 360 are stored by the host 340 and implemented by a file system condition rules engine 350. The rules engine 350 includes a rule fetcher 352, rule executor 354, and alert coordinator 358.

The rule fetcher 352 can be responsible for fetching, receiving, or subscribing to rules from a server and then storing them locally as part of the local rules store 360.

The rule executor 354 can apply the file system condition rules 360 against the file system 390. A content parser 355 can parse content of files and directories and find matches with content specified by a rule as a violation as described herein. The attribute checker 356 can match attributes of files and directories against those specified in a rule as described herein.

When indicated, a rule can generate an alert or other notification that can be processed by the alert coordinator 358, which can report back to the server or other system that gathers alerts from hosts for further processing.

In practice, the host 340 can provide computing services to users, such as by instantiating virtual machines 380 that are supported by the file system 390, which can be part of a control plane (e.g., management layer as part of a hypervisor, operating system, or separated therefrom) for software providing the hosted environment for the virtual machines 380. Unintended artifacts or other conditions in the file system 390 can provide unintended access to the content of the virtual machines 380. Therefore, security of the virtual machines 380 depends on security of the file system 390.

Although computing services are described in the example, hosts can provide a variety of services, such as storage services, data communications resources or the like, any of which can benefit from the described technologies.

Figure 4:
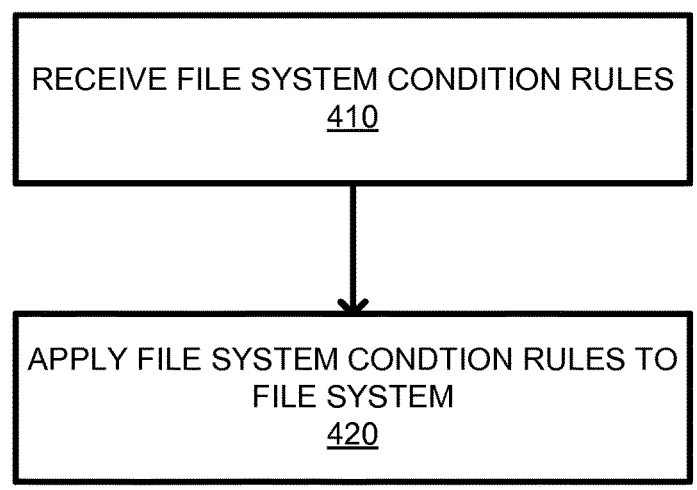
FIG. 4 is a flowchart of an example method implementing coordinated file system security at a host machine.

Example 5—Example Method Implementing Coordinated File System Security: Host Perspective FIG. 4 is a flowchart of an example method 400 implementing coordinated file system security at a host machine and can be implemented, for example, in the host 300 of FIG. 3.

At 410, a plurality of file system condition rules are received. For example, rules can be received from a file system condition rule server as described herein. In practice, rules can be packaged so their authenticity can be verified (e.g., via digital certificates or the like) before accepting them into the local system. Other verifications (e.g., of rule syntax or the like) can be performed.

Such rules can be received responsive to a request to the rule server or received via a web service. Other arrangements (e.g., push functionality) can be supported. Filters can be applied so that the rules are limited to those appropriate for the receiving host. Such filtering can be done remotely, locally, or both. Filtering can be explicit (e.g., by explicitly specifying a tag) or implicit (e.g., filtered by an identity or attribute of the requesting host).

The received rules can be incorporated into local rule storage. Addition, modification, and deletion of local rules can be supported.

At 420, the file system condition rules are applied to the file system local to the host. For example, as described herein, a rule can specify a condition for detecting a violation of the rule by a file in the local file system and a respective action to take upon detection of the violation.

Other conditions, including violations by directories, can be supported as described herein. The rules can support detecting a variety of conditions including detecting presence of plaintext content in a specified file or directory. Files or directories can be filtered based on name, location, or any other attribute as described herein. The rules can support specifying file names, directory names, and plaintext content via pattern matching as described herein.

Responsive to violations of the rules, an action can be taken as described herein. Such actions can include deleting a file, changing file permissions, changing file attributes or metadata, sanitizing content, sending an alert, or the like.

Triggering events for executing file system condition rules are supported as described herein.

Example 6—Example Coordinated File System Security

In any of the examples herein, file system security can be coordinated via interaction with the rule server. Coordination can include affecting multiple target machines via a centralized authority or other server. For example, as a result of specifying one or more rules to a rule server, the rules can then be distributed throughout a set of host machines, where they are applied to detect local violations. Local actions or alerts can then be taken as a result of the distributed rule.

Alerts can also be collected centrally and analyzed for trends, recurring events, or the like. Such information can be helpful to verify that rules are working correctly and to formulate new or modified rules based on feedback from the alerts.

Example 7—Example File System Condition Rules

In any of the examples herein, a wide variety of file system condition rules can be supported to detect a wide variety of conditions and take a wide variety of actions. Scheduling of such rules can also be supported.

A rule can specify what is being looked in the file system for and where to look for it in the file system. The rules can be useful in a variety of scenarios, such as to enforce certain conditions, monitor for certain conditions, investigate certain conditions, or the like. A rules engine applies a rule by searching through the local file system and detecting any occurrences of the specified condition. Detection of the condition indicates a violation.

Conditions detected can include those relating to file attributes, including the name, size, when last accessed, last accessed by, owner, permissions, creation time, or the like. File whitelists and blacklists can also be supported. Similar conditions relating to directories can be supported.

Location, file content, or both can also be specified as conditions.

Responsive to detecting a violation (e.g., a condition) of a rule by a file in the local file system, an action can be taken. Rules can also specify conditions and/or content for directories. Actions can be applied to the offending location, file, directory, content, or combination thereof. As described herein, action can include sending an alert to an alert collector for centralized analysis.

As described herein, rules can be scheduled for execution under a variety of scenarios (e.g., immediately, responsive to detecting an event associated with the rule, or the like).

Rules can be chained to achieve desired results.

Example 8—Example Conditions

In any of the examples herein, a file system condition rule can specify one or more conditions. Upon detection of the condition, the condition is considered to have been violated (e.g., by an offending file, directory, content, or combinations thereof), and a specified action can then be taken (e.g., on the file, directory, content, or combinations thereof, as specified in the rule).

The file system condition rules can support detecting any number of conditions, such as an attribute of a file or directory within the local file system, content within a file or directory in the local file system, or the like. The presence of a file or directory can also be detected.

Such conditions can be used to indicate file system security risk conditions, such as the very presence of a file, the very presence of a directory, presence of sensitive information (credentials, username, password, credit card information, social security numbers, or the like) in a file, one or more attributes of a file or directory such as altered permissions on a file (e.g., allowing access to password hash files to users other than root), a leftover log (e.g., that may contain sensitive data), leftover test data, or the like. In this way, extraneous files, extraneous directories, extraneous content, and other risk conditions can be avoided.

A file system condition can be constructed using the available conditions to identify violations of such file system security risk conditions and take appropriate action.

Example 9—Example Locations in Conditions

In any of the examples herein, a particular location (e.g., drive, directory, folder, or the like) can be specified as part of a condition. Downward recursion can be supported. The entire file system can be searched for the condition if desired (e.g., by specifying no location, a root directory location, or the like).

So, for example, a location can be searched for files, file attributes, directories, directory attributes, content, or the like. The file system condition rules thus support detecting whether any file at a given location within the local file system has specified content.

As described herein, any attribute or presence of a directory can also be specified as a condition. Conditions can be combined (e.g., to detect the presence of a directory at a specified location).

Example 10—Example Rule Format

Figure 5:
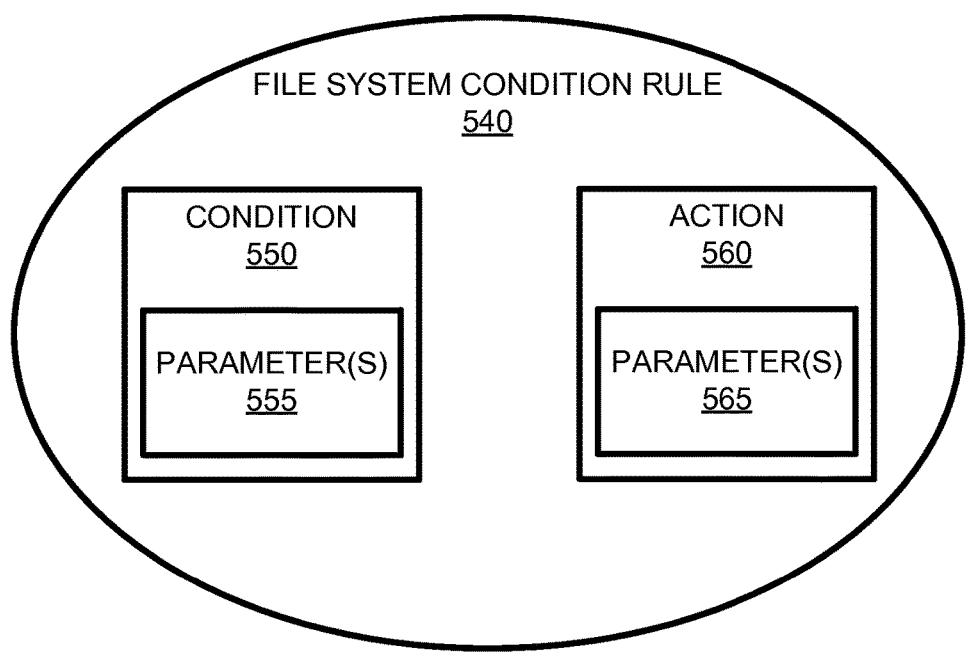
FIG. 5 is a block diagram of an example file system condition rule format.

In any of the examples herein, a file system condition rule can take any of a variety of formats, such as the example format shown for a rule 540 in FIG. 5. In the example, the rule 540 includes a condition 550 with zero, one, or more parameters 555 and a respective action 560 with zero, one, or more parameters 565. When executed, the action 560 can be applied when the condition 550 is detected.

In practice, parameters can be passed between the condition and the action. For example, if an offending file, directory, or content satisfies (e.g., violates) the condition 550, the offending file, directory, or content can be passed as a parameter 565 for the action 560 (e.g., if file leftover.log is found, delete it).

In practice, the format of a rule can vary. For example, a rule of type "delete file" listing a particular file name can simply delete the file if found. The condition and action are thus specified by the rule type and the file name.

As described herein, an action can include any performing an action on the local file system, sending an alert, or both. Although an alert can be included as an action, alerts can be implemented as separate from actions. In some implementations, an action of "none" is thus possible (e.g., only an alert is sent).

The schedule for the rule 540 can be stored as part of the rule 540 or separately.

Example 11—Example File Attribute Condition

In any of the examples herein, a file system condition rule can specify any number of file attributes as part of a rule condition. As a result, the action of the rule is applied to files meeting the condition specified. A wide variety of file attributes can be used to control application of rules so that they are applied to desired files. Examples are shown in the table below, and other scenarios can be supported. For example, the file system condition rules support detecting whether any file in the local file system has one or more specified attributes.

TABLE

File Attributes

| Attribute | Description | Examples |
| --- | --- | --- |
| Name | The file qualifies if it is of a specified name. | All files ending with ".log" |
| Size | The file qualifies if it is of a specified size. | Apply to files greater than 20 MB |
| Last accessed (touched) | The file qualifies if it was last accessed within a specified time frame. Access can be limited to write access or the like. | Apply to files last accessed in the past n days. Apply to files last written to/created after date d. |
| Owner | The file qualifies if it meets specified owner criteria (e.g., the owner is xyz) | Apply to files owned by root |
| Permissions | The file qualifies if it meets specified permissions criteria | Apply to files with read permission by everybody. Apply to files with execute access by everybody. |
| Last accessed (touched) by | The file qualifies if it was last accessed by a specified username. Access can be limited to write access or the like. | Apply to files last accessed by user u |
| Creation time | The file qualifies if it was created within a time frame | Apply to files created in the past n days. Apply to files created after date d. |
| Hash of file | The file qualifies if the hash is different from a specified value | Apply to a particular file if its hash has changed after the hash was last calculated |

Conditions can be combined (e.g., via Boolean expressions), and the conditions can support pattern matching, wildcards, or both. For example, regular expressions or other mechanisms can be used to specify any of a wide variety of matching criteria (e.g., filename=x and permissions=yyy).

As described herein, whitelists and blacklists for locations can be supported.

Attributes for directories can be similarly specified alternatively or in addition to other conditions. For example, a particular directory name can be specified, or all directories at a given location can be specified as a condition (e.g., to take an action if any directories are present at a particular location). Actions can be applied to directories that satisfy a condition. One or more files and one or more directories can be combined into a condition as well.

Example 12—Example File Contents Condition

In any of the examples herein, a rule condition can specify impermissible content that is not allowed to appear in a file or directory. As a result, the action of the rule is applied to files meeting the content condition specified. A wide variety of content types can be specified to control application of rules so that they are applied to desired files, directories, or both. Examples are shown in the table below, and other scenarios can be supported. Content can be specified via pattern matching.

Conditions can be constructed for detecting impermissible or sensitive content such as credentials, user names, user identifiers and the like. Similarly, credit card numbers and other mechanisms for payment can be detected. Such information is sometimes allowed to appear in certain files or directories, so the content condition can be specified in conjunction with other conditions (e.g., file names, file locations, whitelists, blacklists, or the like).

The content conditions can be applied to an entire location (e.g., directory), a particular file, a line in the file, or the offending content itself (e.g., the characters in the file). The related action can then act accordingly (e.g., by deleting or obfuscating the file, line, or content).

TABLE

Content Conditions

| Condition | Description | Examples |
| --- | --- | --- |
| Pattern | The content qualifies if it matches the pattern | Any content with format "9999 9999 9999 9999" (e.g., a credit card number). The content "rosebud" A file with any line starting with "sudo" Any file with "password" |
| Present in dictionary | The content qualifies if it matches an entry in the dictionary | Any content in file adminnames.txt A file with any content in file adminsnames.txt, etc. |

Content in directories can also be specified alternatively or in addition to other conditions. Content can be recognized by searching through the file or directory contents (e.g., parsing keywords or the like), observing the file system's metadata (e.g., permissions, last accessed, etc.) for a file or directory, or the like.

Conditions can specify certain strings (e.g., any arbitrary content, a file name, or the like), tuples (e.g., "password=<value>"), pattern matching, or the like. Patterns can be specified by regular expressions, wildcards, and the like.

Any of the content conditions can be applied to plaintext content in a file or directory, and the rules support detecting presence of plaintext content in a specified file or directory. For example, the rules support specifying plaintext content via pattern matching. Such plaintext content can take the form of ASCII, UTF-8, Unicode, or the like. Thus, the rules can be used to detect plaintext content in violation of a rule.

Violating plaintext content can be detected by parsing plaintext in a file, including source code files, configuration files, word processing files, text files, scripts, textual metadata, and the like. Presence of violating plaintext in a directory can similarly be detected by examining all or specified files in the directory.

Example 13—Example Actions

In any of the examples herein, a rule can specify an action to be taken upon violation of the condition specified. As a result, the specified action is taken as specified in the rule when the condition for the rule is met. A wide variety of actions can be supported in the rules to accomplished desired results, including deleting files or directories, sanitizing files or directories, changing file or directory attributes, sending an alert (e.g., about a file, directory, content, or the like), and the like. File or directory sanitization can include removing impermissible content, obfuscating impermissible content, and the like.

Examples are shown in the table below, and other scenarios can be supported. In this way, the rules can accomplish helpful results. As with other uses of "a" or "an" herein, "an" action can include performing multiple actions, such as deleting a file and sending an alert, or the like. Alert-only actions can be supported and can be useful to monitor conditions, test new rules, or the like.

TABLE

| Action | Description | Examples |
| --- | --- | --- |
| Rule Actions | | |
| Delete file | Files meeting the condition are deleted. In any of the examples herein, different security levels of deletion (e.g., srm, shred, wipe, or the like) are possible. | Delete files meeting specified criteria. |
| Delete directory | Directories meeting the condition are deleted. Different security levels of deletion are possible. | Delete directories meeting specified criteria. |
| Delete content | Content meeting the condition is removed from the offending file. | Delete found credit card number content (e.g., where credit card number is specified by a pattern) |
| Obfuscate content | Content meeting the condition is obfuscated. | Content is jumbled, scrambled, rearranged, encrypted, or partially redacted |
| Replace content | Content meeting the condition is replaced | Replace found credit card number content with "XXXX XXXX XXXX XXXX" |
| Change file attributes | Files meeting the condition have their attributes changed | Change permissions on file to 400. Change owner on file to root |
| Change directory attributes | Directories meeting the condition have their attributes changed. | Change permissions on directory to 400. |
| Alert | An alert is sent. The alert can specify a destination. | Send an alert "File /root/temp.asc on machine x is in violation of a rule." to an administrator. |

Although some examples specify files, actions can be applied to directories as well (e.g., remove content from an offending directory). In any of the examples herein, the technologies can use any variety of mechanisms, tools, and commands to achieve action. For example, existing commands can be used to implement a delete, a secure delete, shred, or the like.

Example 14—Example Additional Actions

In any of the examples herein, additional actions can be taken when an event is detected, even if no conditions are violated. For example, upon log out of an administrator, the log in & log out entry for the administrator can be removed from a log file. Other file system sanitization steps can be taken.

Example 15—Example Whitelists

In any of the examples herein, enforcement of a file or directory whitelist can be supported. For example, for a given location, a list of one or more permitted files or directories can be listed. Violation of the rule comprises the presence of any other files or directories (e.g., a file not in the file whitelist, regardless of name). Upon violation, an appropriate action taken can include deleting the file(s), sanitizing the file(s), deleting the directory or directories, sanitizing the directory or directories sending an alert (e.g., with the file or directory name), or both.

Similarly, whitelists can be used for content to specify that certain content is permitted in only the files or directories listed. Violations can result in removal of the content, obfuscation of the content, an alert, or some combination thereof.

Similarly, blacklists can be supported in that one or more files or directories can be listed that are not permitted to be present or specified content is not permitted within them. Violation of the condition can result in a similar appropriate action for the unpermitted files, directories or content.

Example 16—Example Compound and Complex Conditions

In any of the examples herein, conditions can be combined using Boolean logic and other techniques for particular scenarios. For example, it can be specified that the presence of a file or directory with a matching a condition by itself is a violation, but if another file or directory matching another condition is present, it is not a violation (e.g., If present [file with executable attribute] and NOT present [file ending in ".c"]). Another example is a particular file name (e.g., "passwords.txt") is present, which is a violation, unless there is another file name present (e.g., "passwords.encrypted").

Such an arrangement can be useful to avoid false positives. For example, such a rule can be useful to detect if an executable is in a directory without a corresponding source file (e.g., from which the executable was recently built), whether a passwords file is out of place, or the like.

Another scenario involves if a file with a particular file name can be a violation if the file is in a location other than that specified. For example, a particular file may be permitted, but only in a particular location. Any occurrences outside the specified location are considered violations.

Example 17—Example Rule Schedules

In any of the examples herein, a rule can specify a time or condition at which it is to be executed in the form of a schedule. As a result, the rule is executed as specified in the schedule. A wide variety of schedule parameters can be used to control execution of rules so that they are run when desired. Examples are shown in the table below, and other scenarios can be supported. In this way, the periodicity of execution of the rule can be controlled via the specified schedule.

Although different rules can have different schedules, rules can be grouped together to be run at a same time. For example, a schedule can be designated at which one or more rules are run.

TABLE

Rule Execution Schedule

| Schedule | Description | Examples |
|---|---|---|
| On demand | Rule is executed immediately | Execute now |
| Time | The rule is periodically executed at one or more particular times during a day, week, month, or the like. | Execute every Sunday at 2:00 AM. Execute on the 10th day of the month. |
| Event | The rule is executed upon triggering of an event. Details of the event can be collected as a parameter to be used in other parts of the rule. A delay can be specified. | Execute x minutes after detection of a log out event. The user logging out can be collected as a parameter and used in other parts of the rule (e.g., to find which files the user accessed). |
| n times | The rule is executed n times only. Another instance of the rule can be used to execute the rule again. Can be combined with other conditions (e.g., time schedule). | Execute a rule one time. Execute a rule every Friday for four Fridays. |
| Date range | The rule is run only during the date range. | Execute every day at 3:00 AM between date x and y. |

So, in any of the examples herein, a rule can be executed responsive to detecting an event associated with the rule. Such association can be explicit (e.g., stored with the rule) or implicit (e.g., the rule is stored in a group of rules to which a schedule is applied). Detecting the event can include detecting a log off event. For example, logoffs by a particular username or set of usernames (e.g., administrators) can be watched as events. Other examples of events that can trigger execution include monitoring directories for file creation, directory creation, file modification, file last access, permission changes on a file or directory, on-rule creation (e.g., immediate execution upon receipt of a rule), on-process creation, and the like. Events can be detected by a background process or other event listener. Triggering events for executing file system condition rules are thus supported.

Example 18—Example Alerts

In any of the examples herein, detection of a rule condition violation can result in an alert. Such alerts can be queued locally for sending to another computing system (e.g., the rule server, other alert collector, or the like) for processing. The alert can include information such as a name of the machine on which the condition was detected, severity, offending files and/or content (e.g., and their location), file attributes (e.g., who accessed the file last), a date and time, a rule identifier, or the like.

Although alerts can be sent in combination with performing another action, alerts by themselves can serve useful purposes. For example, trending, analysis, or other analytics can be performed on alerts an associated metadata.

Further, a user interface can be provided (e.g., at the alert collector) by which such alerts can be processed. When displayed in the user interface, an option (e.g., "get file" or "get violation") can be provided to show further information (e.g., the offending content, file, location, or the like) for consideration in making a decision. Alerts can take a variety of forms, such as notifications, added entries to a database, added alert to a web page, text messages, emails, pages, telephone calls, or other mechanisms.

The user interface can be useful when deploying new rule sets, maintaining present rules, and adapting to changing conditions. For example, an administrator can look at an alert and make a decision that a new white list needs to be generated.

An on-the-fly rule generator can be activated via a user interface element and use the alert as a template for creating a new rule. The template can automatically fill in the particular offending machine or its machine type and reuse the condition associated with the alert. The action can be changed from "alert" to "delete," "obfuscate," or the like. In this way, the administrator can easily push out a new rule based on the alert. Or, the alert rule can simply be escalated to a delete rule via a user interface element (e.g., "escalate to delete").

The user interface can provide options for taking action. For example, if an offending file is found, and an alert results, an administrator can proceed to send a command back to the source machine to delete the offending file. Such a command can be sent conveniently by simple activation of a user interface element showing the alert.

From the host computing system perspective, responsive to sending an alert to another computing system for a detected violation (e.g., to an external event collector), a command from the other computing system can be received to take action for the local file system (e.g., deleting a file or any of the other actions described herein). Responsive to the command, the command can be executed at the local host for the local file system.

Example 19—Example Rule: Delete File

Figure 6:
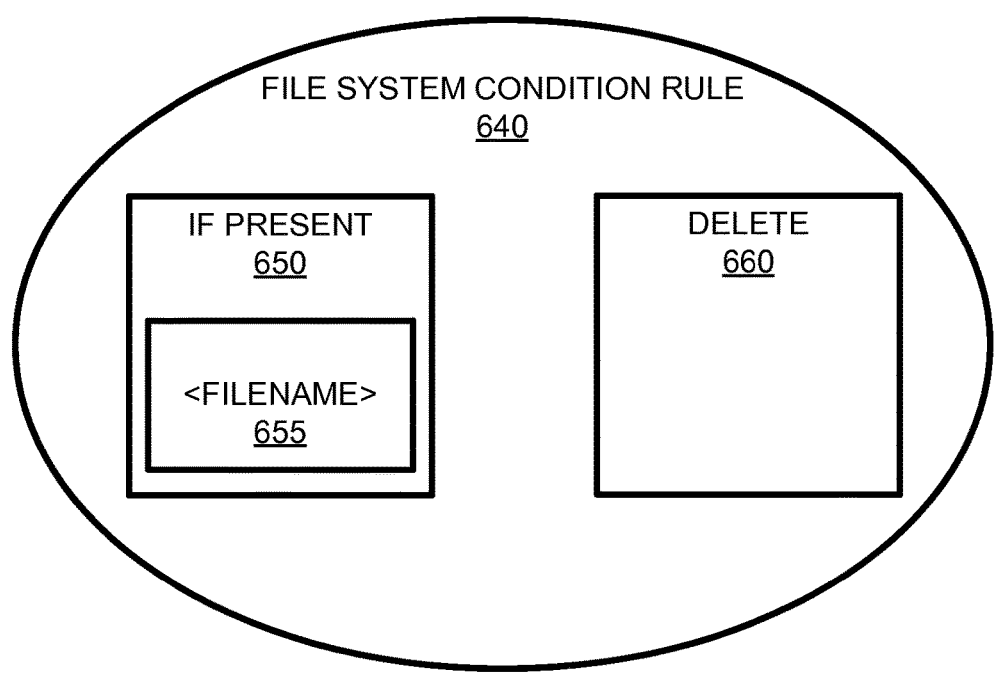
FIG. 6 is a block diagram of an example file system condition rule specifying a delete action.

FIG. 6 is a block diagram of an example file system condition rule 640 specifying a delete action. In the example, a filename 655 is specified as part of an "if present" condition 650. A path can be included to restrict detection of the filename in a particular directory or folder. Recursion down the path can be activated via a flag. The entire file system can be checked (e.g., by specifying "l" as the path). The rule 650 also specifies a delete action 660.

When the rule is executed, it will result in deletion of the file if it is present. The format can differ. For example, the rule can simply indicate that it is a rule of type "delete" and specify the file name. Upon meeting the condition (e.g., the file is present), the file(s) are deleted.

Example 20—Example Rule: Whitelist: Delete File and Alert

Figure 7:
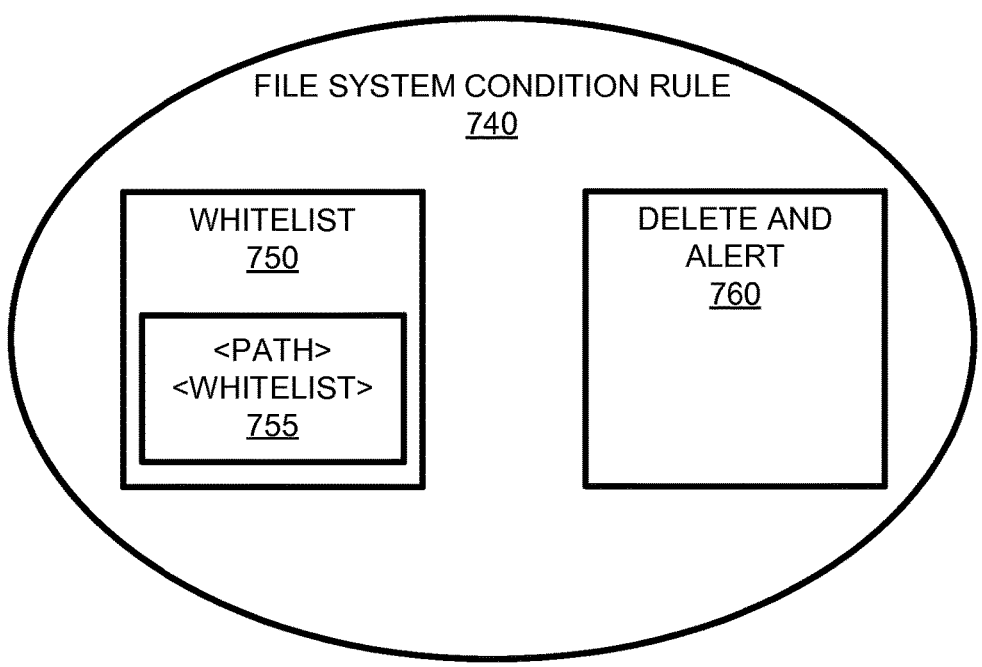
FIG. 7 is a block diagram of an example file system condition rule specifying a whitelist condition.

FIG. 7 is a block diagram of an example file system condition rule 740 specifying a whitelist 750 that includes a path and whitelist 755 of permitted files. If a file is present at the path but not in the whitelist, the action 760 specifies that the file is to be deleted, and an alert is to be sent. In other words, upon execution, the rule deletes files in the specified location that are not in the whitelist. Again, the format can differ and still achieve the same result.

Example 21—Example Logs

In any of the examples herein, a log can be kept of violations. Alternatively, the alert feature described herein can be used to keep a list of violations. Such violations can be categorized according to severity and processed or displayed differently according to their severity.

For example, in FIG. 1, although not shown explicitly, logging functionality can also be provided by which a host 140A-N logs violations of rules and provides log results to the server 120 or other log collector, which can then analyze the logs for further action or alerts. Logs of violations can be used for trends and other analysis.

Example 22—Example Metadata Associated with Violations

In any of the examples herein, metadata associated with a violation (e.g., of a condition) can be identified. For example, when a violation occurs, information such as the host name, file name, directory name, responsible user name (e.g., the last user who accessed an offending file or directory, the last user who modified the offending file or directory, the user who created the offending file or directory, or combinations thereof), current time, current date, time that the file or directory was last accessed or modified, date that the file or directory was last accessed or modified, creation date of the file or directory, file system location, current software revision, a hash associated with a file, a file system condition rule identifier causing the alert, or the like can be stored as associated with the violation.

For example, such metadata can be included as part of the alert or log entry for the violation. An administrator can further control monitoring by specifying that certain metadata is to be presented in certain cases (e.g., for certain hosts). For example, an administrator can specify that the contents of a file, the creation date of a file, hashes of a file, or the like be provided as part of an alert.

Presented metadata can be limited to that associated with the condition (e.g., for a violation based on a file condition, metadata related to the file is presented, while for a violation based on a directory condition, metadata related to the directory is presented). Such metadata can include any of the items includable as part of the condition as described herein.

Example 23—Example Violation Tracking and Analysis

In any of the examples herein, violations of rules can be analyzed for further alerts. Reports can be generated of the violations. So, the technologies can not only take actions such as sanitizing but can also track what actions have been taken or what omissions are present and who was responsible for the condition.

Such a capability can be useful to track behavior of certain administrators or engineers for correction. For example, responsive to detection of a threshold number of violations by a username, host name, or group name, an alert comprising the username, host name, or group name can be sent (e.g., "User xyz has left permissions on /etc/shadow open 2 times after logging out." or "Machine group abc has had directories created in location x 3 times in the last hour."). Depending on the condition, such alerts can be sent with an urgent status so that they are not missed.

Example 24—Example Web Service

In any of the examples herein, a web service can be provided by which rules can be sent to servers, hosts, or both. The web service can provide an application programming interface by which rules can be administered, scheduled, and otherwise controlled at servers or hosts at which a service provider or consumer has appropriate access. For example, an API call can specify a file system condition rule to be incorporated into the file system condition rules at a server, machine group, or individual machine.

The file system condition rules technologies can thus be exposed as a service. For example, via various APIs can be made available as a web service to allow cloud computing consumers to interface with the service. Consumers can specify the machine instances (e.g., by specifying attributes or names) to which rule sets are to be applied or machines. Pre-configured rule sets can be provided, and consumers can edit or provide their own rules. The rules to be applied can be selected so that the technologies can be implemented across a large set of machine instances with little effort by the consumer.

If desired, two instances of the technology can be supported on a single machine: one for the cloud service provider and one for the cloud service consumer. Aspects can be combined as desired.

Thus, the technologies can be applied to any variety of scenarios in which automated control of file system conditions is desired.

Example 25—Example Use Case: Credit Card Numbers

In an example use case, the format of a credit card is specified in a rule condition as impermissible content. A folder name is included in the condition as a whitelist because credit card numbers are allowed to appear in a particular folder. Otherwise, an appropriate action is taken to sanitize the file (e.g., deleting or obfuscating the credit card number), send an alert, or both. Social security numbers can be treated in a similar way or prohibited altogether.

Example 26—Example Use Case: Administrator Activities

Administrators may periodically access the management plane of a host for maintenance, troubleshooting, and the like. Trace elements of the access may be left behind. For example, sensitive information can be left behind. Typical offending material includes verbose log files that may contain sensitive information. Such logs that can contain a wide variety of material, including administrator usernames, details about administrator habits and routines, secret commands, privileged executables, or the like. File permissions may also be changed to make it easier to perform certain tasks.

An administrator may also escalate their privileges in an attempt to complete a task and then change permissions on generated files, inadvertently leaving behind sensitive information that can be easily accessed.

The technologies herein can provide a variety of techniques for automatically deleting unnecessary or extraneous files off the computer. Conditions can also identify sensitive information, such as passwords in configuration files, administrator identifiers, or customer-identifying information such as credit card numbers, social security numbers, or the like. An appropriate action or alert can be taken.

In an example use case, five minutes after an administrator logs off, a rule set is executed. A rule can be included specifying that file(s) accessed by a given user are to be sanitized. The administrator's username is included as a parameter to the rule set.

When the event is triggered, the administrator's home directory is cleaned out (e.g., any files not appearing on a whitelist are removed), the log-in and log-out entry are removed from a log, and counters are reset.

Any files accessed or modified during the session are sanitized or deleted according to rule conditions. For example, files accessed (or created) by the user (e.g., after the associated log on) are detected and sanitized. A rule can specify prohibited plaintext content via pattern matching and that files accessed by the user are to have the prohibited plaintext content removed from them. Such prohibited plaintext content can be any of the sensitive information described herein. For example, the rule can specify a credit card number format as prohibited plaintext content.

Example 27—Example Use Case: Developer Activities

Developers may periodically place their software in a debug mode that generates verbose logs detailing execution. Such logs may have sensitive information (e.g., "17:35 Connecting to host x with username u and password p.") When the system then enters production, such logs may be left behind somewhere on the system. As a result, sensitive information is left for harvesting by an attacker.

A variety of rules can be implemented to avoid such a situation. For example, log files can be deleted, sanitized, or alerted by name. Certain words (e.g., "password") can be detected as impermissible content. Certain user names (e.g., "developer x") can be detected as impermissible content. An appropriate action can be to delete the content, obfuscate it, or delete the offending file.

Example 28—Example Use Case: Password File

In an example use case, a rule condition specifies that the permissions for a password hash file (e.g., /etc/shadow or the like) are to be set to a certain value (e.g., access by root only). If the permissions are not as specified, an alert is sent specifying the host machine identifier and that the condition has been violated. Alternatively or in addition, the permissions on the file can simply be set as specified.

Example 29—Example Heterogeneous Rule Sets

In any of the examples herein, rule sets for a heterogeneous environment can be supported. For example, different rules can be applied to different machine types. The different machine types can indicate a function that a machine performs in a service provider environment. So, machines that share an operating system, processor, or the like can still be of different machine types. For example, a cloud computing environment may include machine types such as server computers, fixed hosts, management computers, or the like.

The file system condition rules can segmented into groups by tags, and different rules can be applied to the different machine types as appropriate. Such tags can be maintained by an administrator of a service provide environment. The rule can then identify a group or class of hosts to which a subset of the rules can be distributed. Associations between tags and hosts can be maintained centrally by a service.

Figure 8:
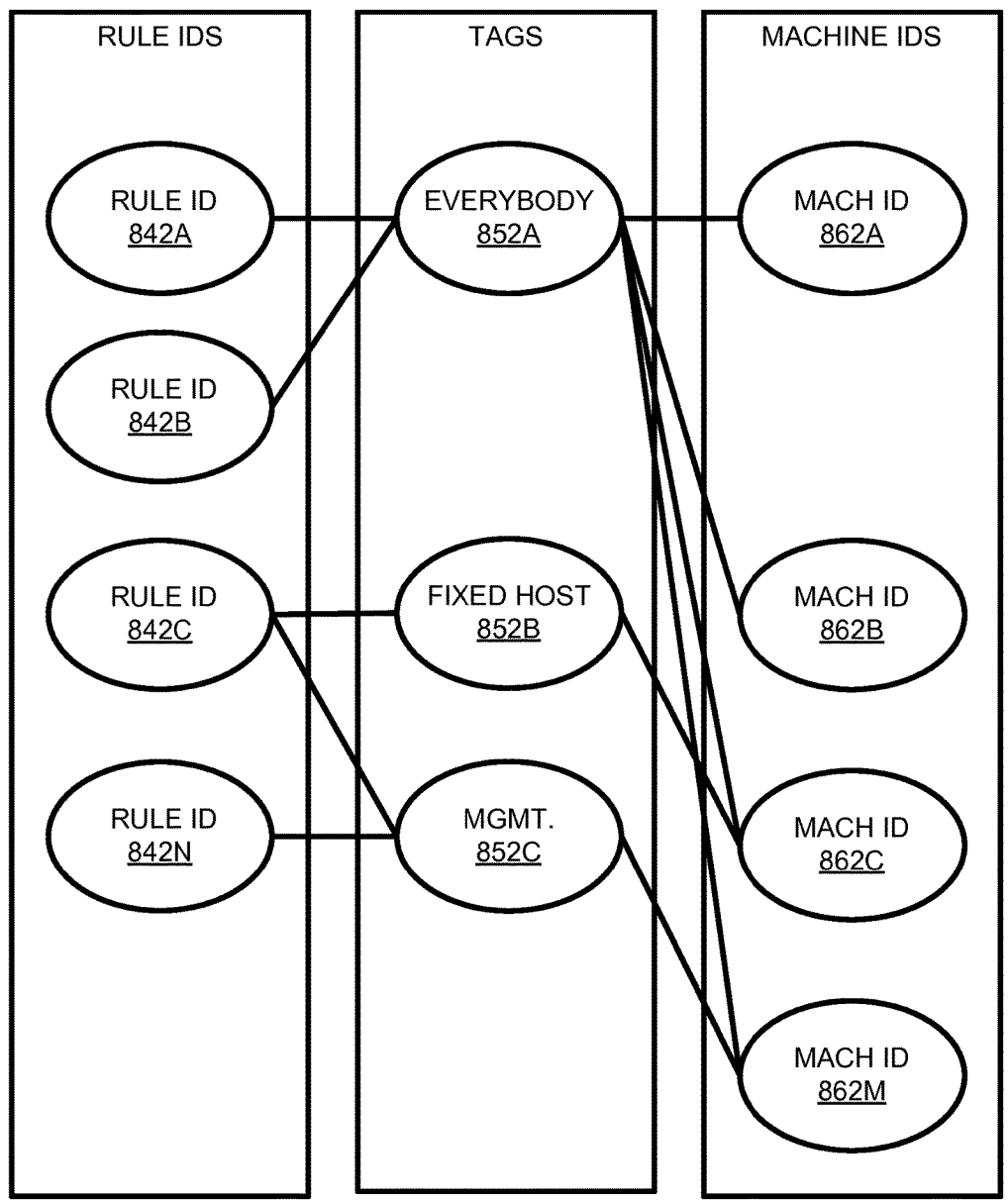
FIG. 8 is a block diagram of an example mapping between tags for rules and identifiers for host machines.

FIG. 8 is a block diagram of an example mapping between tags 852A-C for rules associated with rule identifiers 842A-N and host machine identifiers 862A-M. In the example, many-to-many relationships are supported. So, there can be more than one tag per rule, more than one rule per tag, more than one tag per machine identifier, and more than one machine identifier per tag. In practice, the actual number of tags, rules, and machine identifiers can vary to support more complex scenarios as desired. Mappings between tags and machine groups (e.g., that are ultimately mapped to machines) can also be supported.

Some rules may be applicable to any machine and therefore included in a group called "everybody" or the like 852A. Other rules may be associated with a particular machine type or class, 852B, 852C, and one or more machines (e.g., hosts) 862C, 862M can be associated with a respective type or class (e.g., by virtue of a machine id or the like).

Tags or keywords 852A-N can be associated with rules (via rule identifiers 842A-N), and the rule server can be configured to provide a subset of the rules associated with a given tag out of the tags. When distributed, the file system condition rules can be received by a local host associated with one or more tags specifying respective sets of file system condition rules. The plurality of file system condition rules received can be chosen based on the one or more tags.

To determine the appropriate rules for a machine, a rule server can manage the tags locally or rely on a tag service. For example, a query to a tag service from the rule server can ask for those machines appropriate for a given tag. The service can then provide a list of hosts to which the rules associated with the tag are to be applied. Rules associated with the given tag can then be sent to hosts in the list. Alternatively, given a host, the tag service can provide the appropriate tags. In this way, a group or class of machines can be designated to receive rules. The rule server can be configured to provide a subset of the rules to a given host out of the plurality of hosts based on a mapping between tags for the rules and identifiers for the hosts.

Any number of attributes or metadata for the hosts can be used to determine tags, such as IP address, host name, name of server, network name, or the like. Such tag associations or metadata can be maintained outside of the host machines themselves. So, for example, a tag can be applied via a central authority without action by the host. The appropriate rules associated with the tag can then end up being distributed to the host via manipulation of the managed metadata for the host.

So, if the tags represent machine types, the hosts can be associated with a given machine type, and the hosts can be configured to periodically fetch rules from the rule server based on their machine type by specifying the machine type as the given tag. Or the machine type can be implicit and maintained external to the host (e.g., the rules are based on machine type via a host identifier identifying the host, but the host need not specify the host name or machine type).

As a result, the file system condition rules received by the local host are a subset of file system condition rules stored at the rule server and are designated (e.g., via association of a tag with the host identifier) as applicable to the local host.

Thus, heterogeneous environments with different machine types, different operating systems, different versions of software, or the like can benefit from the technologies.

If desired, an API can be provided via a web service to configure relationships between rules, tags, and machines, create new tags, and the like.

Example 30—Rule Synchronization

In any of the examples herein, local rules can be synchronized with those present on the rule server. Such synchronization can happen periodically, in response to detected events, or the like. In this way, the rules can be kept up to date.

Example 31—Example Incorporation into Cloud Computing Environment

Figure 9:
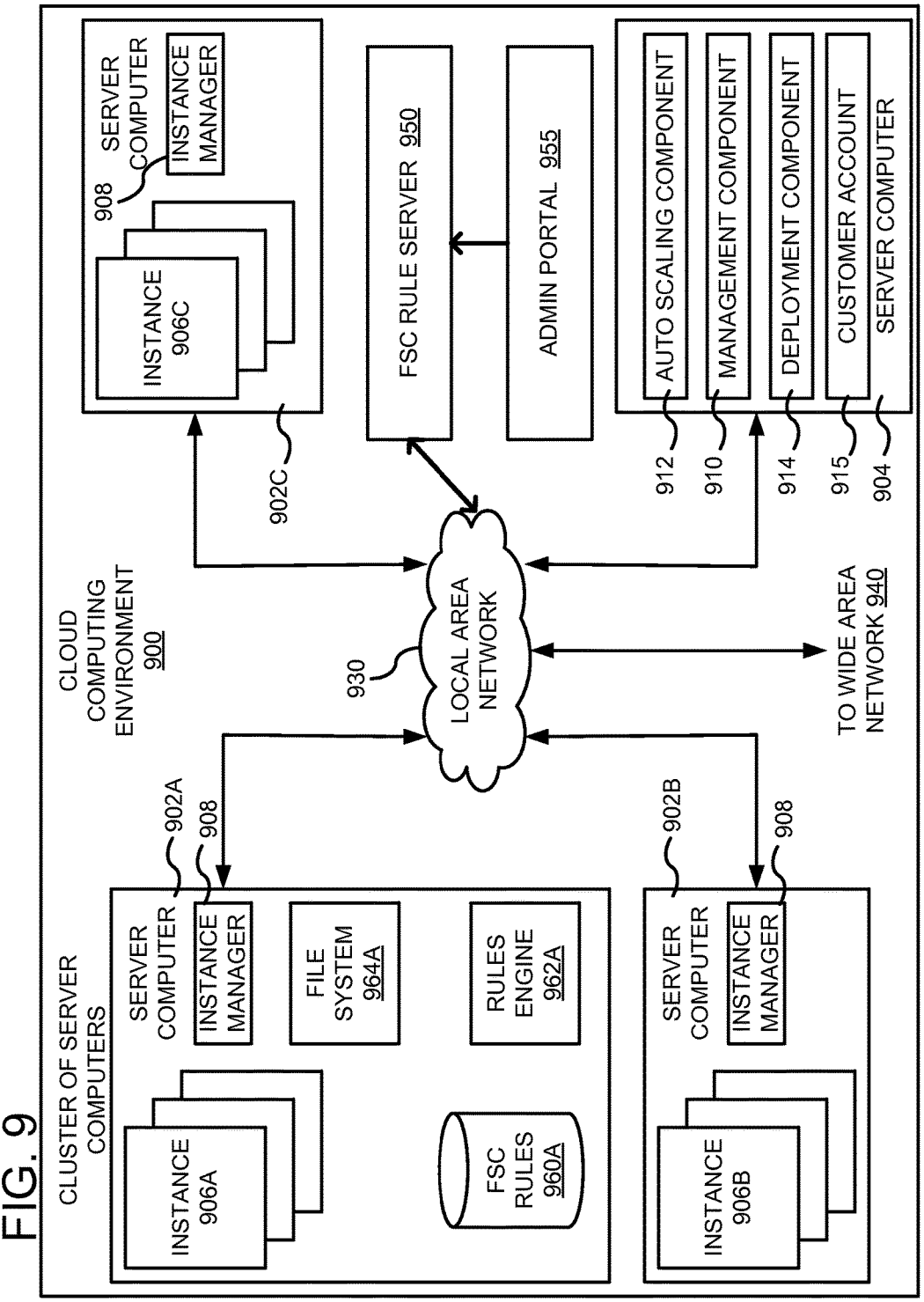
FIG. 9 is a computing system diagram of a cloud computing environment that illustrates one environment in which embodiments described herein can be used.

FIG. 9 is a computing system diagram of a cloud computing environment 900 that illustrates one possible environment in which embodiments described herein can be used.

By way of background, the environment 900 (i.e., offered by a cloud provider) is capable of delivery of computing and storage capacity as a service to a community of end recipients. Although a cloud computing environment 900 can serve as a virtual network established as a private cloud environment, such an environment 900 can support a multi-tenant environment, wherein a plurality of customers operate independently (i.e., a public cloud environment). Generally speaking, the environment 900 can provide the following models: Infrastructure as a Service ("IaaS"), Platform as a Service ("PaaS"), and/or Software as a Service ("SaaS"). Other models can be provided. For the IaaS model, the environment 900 can offer computers as physical or virtual machines and other resources. The virtual machines can be run as guests by a hypervisor. The PaaS model delivers a computing platform that can include an operating system, programming language execution environment, database, and web server. Application developers can develop and run their software solutions on the virtual network provider platform without the cost of buying and managing the underlying hardware and software. The SaaS model allows installation and operation of application software in the virtual network provider. In some embodiments, end users access the environment 900 using networked client devices, such as desktop computers, laptops, tablets, smartphones, etc. running web browsers or other lightweight client applications.

The particular illustrated cloud environment 900 includes a plurality of server computers 902A-C. While only three server computers are shown, any number can be used, and large centers can include thousands of server computers. The server computers 902A-C can provide computing resources for executing software instances 906A-C. In one embodiment, the instances 906A-C are virtual machines. As known in the art, a virtual machine is an instance of a software implementation of a machine (i.e. a computer) that executes applications like a physical machine. In the example of virtual machine, each of the servers 902A-C can be configured to execute an instance manager 908 capable of executing the instances. The instance manager 908 can be a hypervisor or another type of program configured to enable the execution of multiple instances 906 on a single server. Additionally, each of the instances 906 can be configured to execute one or more applications.

In the example, coordinated file system condition security via rules can be incorporated into the server computers 902A-C (e.g., the hosts described herein) as rules 960A executed by the rules engine 962A to detect specified conditions in the file system 964A and take appropriate actions.

Although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 904 can be reserved for executing software components for managing the operation of the server computers 902 and the instances 906. For example, the server computer 904 can execute a management component 910. A customer can access the management component 910 to configure various aspects of the operation of the instances 906 purchased by the customer.

For example, the customer can purchase, rent or lease instances and make changes to the configuration of the instances. The customer can also specify settings regarding how the purchased instances are to be scaled in response to demand. An auto scaling component 912 can scale the instances 906 based upon rules defined by the customer. In one embodiment, the auto scaling component 912 allows a customer to specify scale-up rules for use in determining when new instances should be instantiated and scale-down rules for use in determining when existing instances should be terminated. The auto scaling component 912 can consist of a number of subcomponents executing on different server computers 902 or other computing devices. The auto scaling component 912 can monitor available computing resources over an internal management network and modify resources available based on need.

A deployment component 914 can be used to assist customers in the deployment of new instances 906 of computing resources. The deployment component can have access to account information associated with the instances, such as who is the owner of the account, credit card information, country of the owner, etc. The deployment component 914 can receive a configuration from a customer that includes data describing how new instances 906 should be configured. For example, the configuration can specify one or more applications to be installed in new instances 906, provide scripts and/or other types of code to be executed for configuring new instances 906, provide cache logic specifying how an application cache should be prepared, and other types of information. The deployment component 914 can utilize the customer-provided configuration and cache logic to configure, prime, and launch new instances 906. The configuration, cache logic, and other information may be specified by a customer using the management component 910 or by providing this information directly to the deployment component 914.

Customer account information 915 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A file system condition rule server 950 can be connected through the local area network 930 to the one or more server computers 904, server computers 902, or other server computers (not shown). Rules can be provided by the separate server 950 (e.g., as administered by the portal 955) or incorporated into the server 904. Different file system condition rules can be applied to the server 904 and the servers 902A-C (e.g., by use of tags as described herein).

A network 930 can be utilized to interconnect the server computers 902A-C and the server computer 904. The network 930 can be a local area network (LAN) and can be connected to a Wide Area Network (WAN) 940 so that end users can access the environment 900. The network topology illustrated in FIG. 9 has been simplified and many more networks and networking devices can be utilized to interconnect the various computing systems disclosed herein.

Example 32—Example Computing Environment

Figure 10:
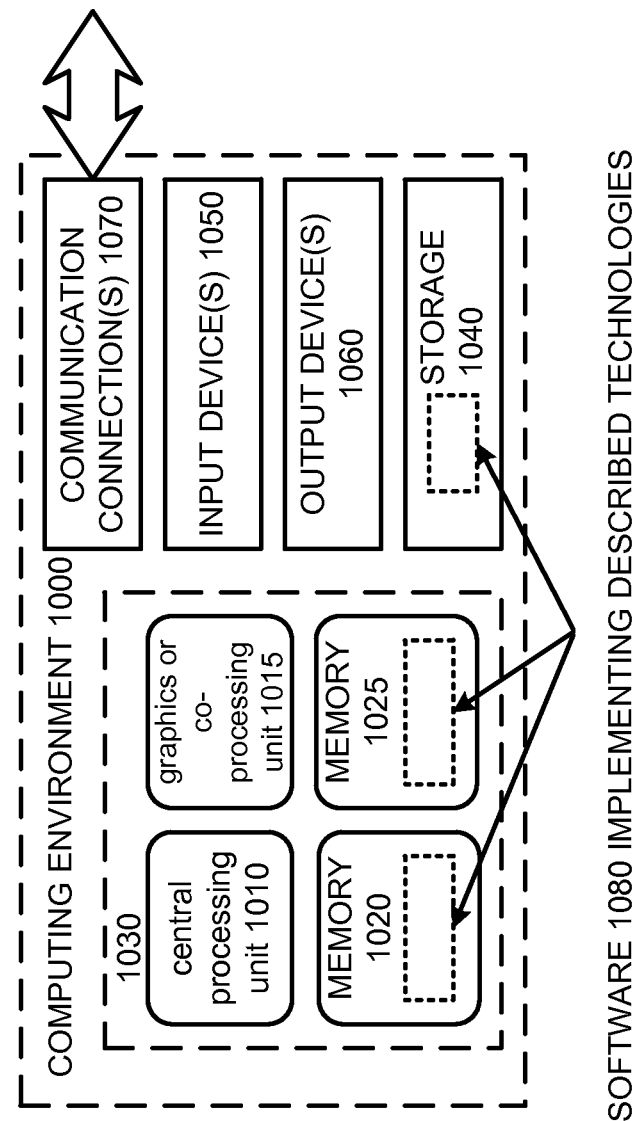
FIG. 10 depicts a generalized example of a suitable computing environment in which the described innovations may be implemented.

FIG. 10 depicts a generalized example of a suitable computing environment (e.g., computing system) 1000 in which the described innovations may be implemented. The computing environment 1000 is not intended to suggest any limitation as to scope of use or functionality, as the innovations may be implemented in diverse general-purpose or special-purpose computing systems. For example, the computing environment 1000 can be any of a variety of computing devices (e.g., desktop computer, laptop computer, server computer, tablet computer, etc.).

With reference to FIG. 10, the computing environment 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations described herein, in the form of computer-executable instructions suitable for execution by the processing unit(s).

A computing system may have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing environment 1000. The storage 1040 stores instructions for the software 1080 implementing one or more innovations described herein. For example, the rules engine and others described herein can be the software 1080 executed from the memory 1020.

The input device(s) 1050 may be a touch input device such as a keyboard, mouse, pen, or trackball, a voice input device, a scanning device, or another device that provides input to the computing environment 1000. The output device(s) 1060 may be a display, printer, speaker, CD-writer, or another device that provides output from the computing environment 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although direct connection between computer systems is shown in some examples, in practice, components can be arbitrarily coupled via a network that coordinates communication.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or nonvolatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

For example, although detection of sensitive information is described, the methods described herein can also be used to detect any of a variety of content.

Non-Transitory Computer-Readable Media

Any of the computer-readable media herein can be non-transitory (e.g., memory, magnetic storage, optical storage, solid-state drives, or the like).

Storing in Computer-Readable Media

Any of the storing actions described herein can be implemented by storing in one or more computer-readable media (e.g., computer-readable storage media or other tangible media).

Any of the things described as stored can be stored in one or more computer-readable media (e.g., computer-readable storage media or other tangible media).

Methods in Computer-Readable Media

Any of the methods described herein can be implemented by computer-executable instructions in (e.g., encoded on) one or more computer-readable media (e.g., computer-readable storage media or other tangible media). Such instructions can cause a computer to perform the method. The technologies described herein can be implemented in a variety of programming languages.

Methods in Computer-Readable Storage Devices

Any of the methods described herein can be implemented by computer-executable instructions stored in one or more computer-readable storage devices (e.g., memory, magnetic storage, optical storage, solid-state drives, or the like). Such instructions can cause a computer to perform the method.

Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. I therefore claim as my invention all that comes within the scope and spirit of the claims.

What is claimed is:

1. A method implemented at least in part by a computing system, the method comprising:
   in a computing environment comprising a plurality of hosts accessed by an administrative user identified by a username, at a local host comprising a control plane for software providing a hosted environment for virtual machines, receiving a plurality of file system condition rules from a file system condition rule server;
   applying the file system condition rules to a local file system at the local host, wherein the file system condition rules comprise a file system condition rule specifying a permissions detection condition for detecting a violation of the file system condition rule by an offending file or directory in the local file system and a respective action to take upon detection of the violation, and wherein the file system condition rule specifies the username of the administrative user, detecting presence of specified permissions for files or directories accessed or created by the username of the administrative user during a log on session to the control plane of the local host;
   detecting the files or directories accessed or created by the username of the administrative user during the log on session to the control plane of the local host;
   responsive to detection of the permissions detection condition specified by the file system condition rule, taking the respective action specified by the file system condition rule, wherein the respective action comprises changing permissions of the files or directories accessed or created by the username of the administrative user during the log on session to the control plane of the local host, and wherein the files or directories accessed or created by the username of the administrative user are accessed or created as a result of administrator activities;
   further responsive to detection of the permissions detection condition specified by the file system condition rule, sending an alert comprising metadata associated with the permissions detection condition, wherein the metadata comprises a name of the local host and the username, wherein the username identifies an administrator responsible for the permissions detection condition; and
   responsive to detection of a threshold number of violations by the username identifying the administrator responsible for the permissions detection condition, sending an alert comprising the username identifying the administrator responsible for the permissions detection condition, whereby administrator activities behavior of the administrator identified by the username is tracked across the plurality of hosts.

2. The method of claim 1 wherein:
   the file system condition rules comprise actions deleting a file or directory, actions sending an alert, alert-only actions, and actions removing content; and
   at least one of the file system condition rules specifies a triggering event for executing the at least one of the file system condition rules.

3. The method of claim 1 further comprising:
   after sending an alert for a detected violation to an external event collector, receiving a command to take an action for the local file system; and
   responsive to receiving the command, executing the command at the local host for the local file system.

23

4. The method of claim 1 wherein:
the file system condition rules received by the local host are a subset of file system condition rules stored at the file system condition rule server and are designated as applicable to the local host.

5. The method of claim 1 wherein:
the administrator activities comprise escalating privileges.

6. A system comprising:
a rule server comprising one or more processors and memory, the rule server storing a plurality of rules, wherein the rules are associated with respective tags, and the rules comprise a rule specifying a permissions condition for detecting a permissions condition violation by a file or directory in a file system that violates the rule and a respective action to take upon detection of the permissions condition violation, wherein the rule specifies changing permissions of files or directories accessed or created by a given administrative user during a log on session to a local host;
a plurality of hosts coupled to the rule server and configured to receive at least a subset of the rules from the rule server, wherein a given host out of the hosts comprises a rules engine operable to apply the rules at the given host against a local file system, wherein the given host is operable to detect that the given administrative user has logged off, and as a result, detect which files or directories accessed or created in the local file system by the given administrative user during the log on session to the given host violate the rule specifying a permissions condition for detecting a permissions condition, and change permissions of one or more of the files or directories accessed or created by the given administrative user in the local file system during the log on session to the given host;
metadata associated with the permissions condition violation, wherein the metadata comprises a username responsible for the permissions condition violation; and
an alert collector configured to send an alert comprising the username responsive to detection of a threshold number of violations by the username, whereby behavior of an administrator having the username is tracked across the plurality of hosts.

7. The system of claim 6 wherein:
the tags represent machine types;
the hosts are associated with respective machine types via the tags; and
the hosts are configured to periodically fetch rules from the rule server based on their machine type via a host identifier identifying a given host.

8. The system of claim 6 wherein:
the condition specifies detecting whether any file at a given location within the local file system has specified plaintext content.

9. The system of claim 6 wherein:
the rules comprise a rule specifying a condition for detecting a violation of the rule by a directory in the local file system and a respective action to take upon detection of the violation.

10. The system of claim 6 wherein:
the rule is executed responsive to detecting an event associated with the rule.

11. The system of claim 6 wherein:
the rules comprise a rule specifying detecting an attribute of a file or directory.

24

12. The system of claim 11 wherein:
at least one of the rules specifies an attribute of a file as a username that last accessed the file;
at least one of the rules specifies an attribute of a file as permissions of the file; and
at least one of the rules specifies an attribute of a file as owner of the file.

13. The system of claim 6 wherein:
at least one of the rules specifies enforcing a file whitelist for a location in the local file system;
violation of the file whitelist comprises presence of a file not in the file whitelist;
at least one of the rules specifies enforcing a file blacklist for a location in the local file system; and
violation of the file blacklist comprises presence of a file in the file blacklist.

14. The system of claim 6 wherein:
at least one of the rules specifies detecting whether any file in the local file system has one or more specified attributes.

15. The system of claim 6 wherein:
the rules engine is operable to take the respective action responsive to detecting the violation of the rule by the file or directory in the file system.

16. The system of claim 15 wherein:
at least one of the rules specifies an action of deleting the file; and
at least one of the rules specifies an action of sending an alert about the file.

17. The system of claim 16 wherein:
at least one of the rules specifies an action of sanitizing the file; and
at least one of the rules specifies an action of changing attributes of the file.

18. The system of claim 16 wherein:
the alert specifies a location and filename for the file and is sent to another computing system for processing.

19. The system of claim 6 wherein:
the local file system is maintained as part of a control plane providing a hosted environment for one or more virtual machines.

20. The system of claim 6 wherein:
the rule server is configured to provide a subset of the rules to a given host out of the plurality of hosts based on a mapping between tags for the rules and identifiers for the hosts.

21. One or more computer-readable storage media comprising computer-executable instructions causing a computing system to perform a method comprising:
sending a request to a server for rules;
responsive to the request, receiving, from the server, a rule comprising a condition specifying files or directories accessed by a given administrative user and an action specifying that permissions of files or directories accessed by the given administrative user are to be changed, wherein the rule specifies prohibited permissions and that files or directories accessed by the given administrative user are to have their permissions changed when they satisfy the rule; and
upon detection of an event indicating that the given administrative user has logged off, applying the rule to a local file system for the given administrative user, wherein the applying comprises detecting files or directories accessed by the given administrative user, determining that the detected files or directories have the prohibited permissions specified via the rule and taking an action on the detected files or directories, wherein taking an action comprises changing permissions of the files or directories as specified in the rule.

22. The one or more computer-readable storage media of claim 21 wherein:
at least one of the rules specifies a credit card number format as prohibited plaintext content.

23. The one or more computer-readable storage media of claim 21 wherein:
the given administrative user logging off is collected as a parameter for the rule; and
the parameter is used to detect which files were accessed by the given administrative user logging off.

* * * * *